United States Patent

Kumar et al.

Patent Number: 5,999,188
Date of Patent: Dec. 7, 1999

[54] SYSTEM AND METHOD FOR PARAMETRIC SURFACE REPRESENTATION FROM POLYGONAL DESCRIPTIONS OF ARBITRARY OBJECTS

[75] Inventors: Nishit Kumar, Orlando, Fla.; Vineet Goel, Santa Clara; Leonardo Vainsencher, San Jose, both of Calif.

[73] Assignee: LSI Logic Corporation, Milpitas, Calif.

[21] Appl. No.: 08/810,256

[22] Filed: Mar. 3, 1997

[51] Int. Cl.[6] .................................................. G06T 17/30
[52] U.S. Cl. .......................... 345/423; 345/420; 345/433; 345/441
[58] Field of Search .................................. 345/418, 423, 345/420, 433, 441

[56] References Cited

U.S. PATENT DOCUMENTS 5,894,308  4/1999  Isaacs ....................................... 345/420

OTHER PUBLICATIONS

Cohen et al., "Simplification Envelopes", Computer Graphics Proceedings, pp. 119–127, Aug. 1996.
Eck et al., Technical Report entitled, "Automatic Reconstruction of B–Spline Surfaces of Arbitrary Topological Type," pp. 1–17, (a) & (b).
Hoppe et al., "Surface Reconstruction from Unorganized Points," Computer Graphics, vol. 26, Jul. 2, 1992, pp. 71–78.
Shantz et al., "Shading Bicubic Patches," Computer Graphics, vol. 21, No. 4, Jul. 1987, pp. 189–195.
Krishnamurthy et al., "Fitting Smooth Surfaces to Dense Polygon Meshes," Department of Computer Science, Stanford University, Stanford, CA, 1996, pp. 1–12.
Lien et al., "Adaptive Forward Differencing for Rendering Curves and Surfaces," Computer Graphics, vol. 21, No. 4, Jul. 1987, pp. 111–117.
Peters, J., Designing Fair Curves and Surfaces, SIAM, 1994, pp. 273–293.
Halstead et al., "Reconstructing Curved Surfaces From Specular Reflection Patterns Using Spline Surface Fitting of Normals," University of California at Berkeley, 1996, pp. 1–7.

*Primary Examiner*—Mark K. Zimmerman
*Assistant Examiner*—Motilewa Good-Johnson
*Attorney, Agent, or Firm*—Conley, Rose & Tayon; Jeffrey C. Hood; Dan J. Krueger

[57] ABSTRACT

The present invention addresses the problem of describing an arbitrary object (up to user-defined limits) given a set of triangles with vertex normals describing the object. A novel method of successively merging traingles into larger and larger patches to compute a set of "as-few-as-possible" Bezier patches is presented. This method is not only applicable to arbitrary objects, but also aims at producing as few patches as possible depending on the geometry of the input object. Also presented are methods to enforce $C^0$- and $C^1$-continuity between a pair of patches $B_L(s,t)$ and $B_R(s,t)$, placed arbitrarily. The methods perturb the appropnate control points to achieve geometric continuities. For $C^0$-continuity the area of the hole between the patches is minimized by formulating the area as a series of linear programs, where the continuity has to be enforced across the adjacent boundary curves $B_L(1,t)$ and $B_R(0,t)$. Similarly, to enforce $C^1$-continuity the hole-area in tangential space is minimized.

16 Claims, 11 Drawing Sheets

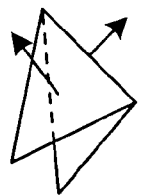
(a)
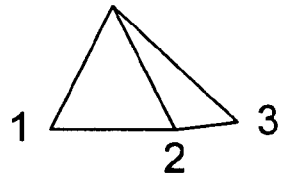
(b)
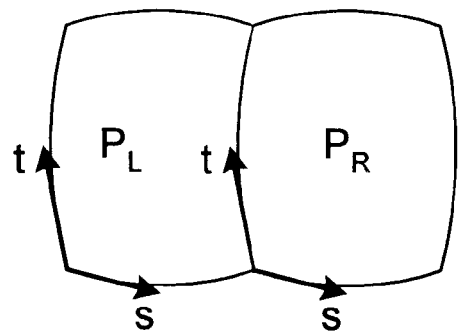
(c)
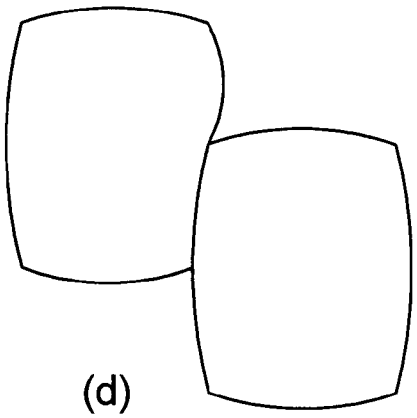
(d)
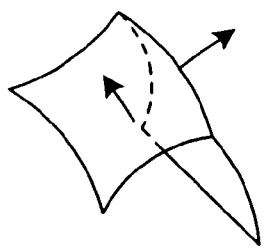
(e)
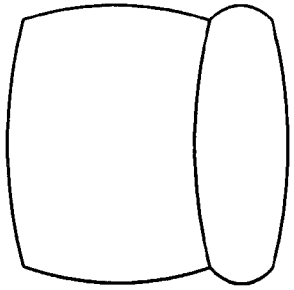
(f)
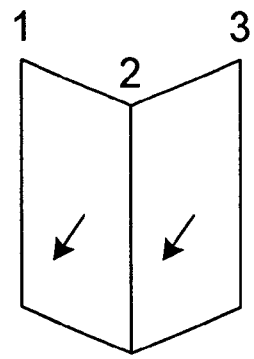
(g)
FIG. 2

Procedure SuccessiveMerging()
Input: Set of Triangles T
Output: Set of bicubic patches
1. Form dual graph G for the given set of triangles.
2. Form a subgraph $G_c$ of G containing only edges for "combinable" triangle-pairs.
3. Compute the maximum-cardinality matching M of $G_c$
4. Create a 1 x 1 patch for each matched triangle-pair (i.e., M pairs) as well as for each remaining triangle (i.e., $|T|-2|M|$ triangles)
5. repeat a few times (usually, 4 times)
6. Modify G by short-cutting all edges e∈M and renumbering node-labels
7. Form a subgraph $G_c$ of G containing only edges for "combinable" patch-pairs
8. Compute the maximum-cardinality matching M of $G_c$
9. Approximate each matched patch-pair by a larger patch and elevate by one the degree of those patches which are unmatched.
10. end repeat

FIG. 3

Procedure CanonicalRotations()
Input: Patch $B_L(s,t)$, $B_R(s,t)$
Output: int $rot_L$, $rot_R$
Constant: HIGH
1. min_area: =HIGH
2. for each i = 0,1,2,3 do
3.    for each j = 0,1,2,3 do
4.       $B'_L(s,t)$: = $B_L(s,t)$ rotated counterclockwise i times
5.       $B'_R(s,t)$: = $B_R(s,t)$ rotated counterclockwise j times
6.       a: = area between curves $B'_L(1,t)$ and $B'_R(0,t)$
7.       if (min_area > a) then
8.          min_area: =a
9.          $rot_L$: =i
10.         $rot_R$: =j
11.      end if
12.   end for
13. end for

FIG. 6

Procedure TwoCurvesArea()
Input: Curve $B_L(t)$, $B_R(t)$
Output: float a
Constant: num_segments
1. a: = 0
2. $\Delta$ : = 1/num_segments
3. for each t = 0, $\Delta$ ,2$\Delta$ , ..., 1 - $\Delta$ do
4.    a: = a + area of the trapezoid $B_L(t)$ - $B_L(t + \Delta)$ - $B_R(t+\Delta)$-$B_R(t)$ - $B_L(t)$
5. end for

FIG. 7

Procedure ClosestPoint()
Input: Curve B(t), Point p
Output: Parameter $t_{close}$
Constants: HIGH, M,N
/* Coarse search for the closest segment */
1. min_dist = HIGH
2. $\Delta$ = 1/N
3. for each segment i, $1 \leq i \leq N$ of B(t) extending from B(i$\Delta$-$\Delta$) to B(i$\Delta$) do
4.    d:= Euclidean distance between p and the midpoint B(i $\Delta$- $\frac{\Delta}{2}$) of segment i
5.    if (d < min_dist) then
6.       min_dist: =d
7.       min_seg: =i
8.    end if
9. end for
/* Intense search within the closest segment (on similar lines as coarse search) */
10. From among M equally-spaced points on the segment from B(min_seg $\Delta$- $\Delta$)
    to B(min_seg $\Delta$), choose $t_{close}$ such that the point B($t_{close}$) is closest to p
11. return $t_{close}$

FIG. 8

Procedure Minimization()
/* For $C^0$-continuity $g_a^L$, $g_b^L$, $g_a^R$, $g_b^R$ are $g_{31}^L$, $g_{32}^L$, $g_{01}^R$, $g_{02}^R$ respectively */
/* whereas for $C^1$-continuity, they are $g_{21}^L$, $g_{22}^L$, $g_{11}^R$, $g_{12}^R$ respectively */
1. repeat
2.    Compute: roots $r_1$, $r_2$, $r_3$
           coefficients $h_0$, $h_1$, $h_2$, $h_3$, $h_4$
           perturbation limit $\epsilon$
3.    Solve using SIMPLEX the following linear program:

$$W \leq g_a^L + \epsilon$$
$$W \geq g_a^L - \epsilon$$
$$X \leq g_b^L + \epsilon$$
$$X \geq g_b^L - \epsilon$$
$$Y \leq g_a^R + \epsilon$$
$$Y \geq g_a^R - \epsilon$$
$$Z \leq g_b^R + \epsilon$$
$$Z \geq g_b^R - \epsilon$$

minimize $h_0 W + h_1 X + h_2 Y + h_3 Z + h_4$
4.    Update the values of $g_a^L$, $g_b^L$, $g_a^R$, $g_b^R$ by W, X, Y, Z, respectively
5. until ($h_0 W + h_1 X + h_2 Y + h_3 Z + h_4$ is "sufficiently" close to 0)

FIG. 9

Procedure Continuity()
Input: File f
Output: Set of patches P
1. Read from the input file f the following:
    Set of patches $P_1, P_2, \ldots$
    Dual Graph G
    Boolean C1Flag[m]   /* One for each of the m edges in G */

/* $C^0$-continuity setup and computations */
2. for each edge $e = (P_L, P_R)$ in G do
3.     Compute the # of counterclockwise rotations for converting
       $P_L$ and $P_R$ into the canonical form
4.     Compute parameters $a_L, b_L, a_R, b_R$
5.     Compute the hole area $\int_0^1 \left| (B_L(1,t) \Big|_{a_L}^{b_L}) - (B_R(0,t) \Big|_{a_R}^{b_R}) \right| dt$
6. end for
7. repeat for a few passes (about 10 times)
8.     Sort edges in nonincreasing order of hole area
9.     for each edge $e = (P_L, P_R)$ with hole area > "tolerance" do
10.        Convert pair $P_L, P_R$ to canonical form using counterclockwise rotations
11.        Perform minimization in each of the three directions X, Y, Z
12.        Convert pair $P_L, P_R$ back to its previous form using clockwise rotations
13.    end for
14.    Recompute the hole area for each edge in the graph
15. end repeat /* $C^1$-continuity setup and computations */
16. for each edge $e = (P_L, P_R)$ with C1Flag[..] = ON do
17.    Compute the tangential hole-area $\int_0^1 \left| (\frac{\partial B_L}{\partial s}(1,t) \Big|_{a_L}^{b_L}) - (\frac{\partial B_n}{\partial s}(0,t) \Big|_{a_R}^{b_R}) \right| dt$
18. end for
19. repeat for a few passes (about 10 times)
20.    Sort edges with C1Flag = ON in nonincreasing order of tangential hole-area
21.    for each edge $e = (P_L, P_R)$ with tangential hole-area > "tolerance" do
22.        Convert pair $P_L, P_R$ to canonical form using counterclockwise rotations
23.        Perform minimization in each of the three directions X, Y, Z
24.        Convert pair $P_L, P_R$ back to its previous form clockwise rotations
25.    end for
26.    Recompute the tangential hole-area for each edge with C1Flag[..] = ON
27. end repeat

FIG. 10

| Object | # Polygons | # Patches at the end of Stage | | | | | | | | | |
|---|---|---|---|---|---|---|---|---|---|---|---|
| | | 1 | 2 | 3 | 4 | 5 | 6 | 7 | 8 | 9 | 10 |
| sphere.octant | 100 | 50 | 25 | 13 | 10 | 8 | 7 | 6 | 6 | 6 | 6 |
| goblet | 576 | 288 | 144 | 92 | 52 | 35 | 30 | 27 | 25 | 24 | 24 |
| teapot | 780 | 390 | 216 | 141 | 103 | 90 | 83 | 81 | 80 | 80 | 80 |
| sphere | 864 | 432 | 216 | 113 | 62 | 36 | 23 | 18 | 15 | 13 | 13 |
| cow | 5804 | 2912 | 1680 | 1332 | 1217 | 1183 | 1178 | 1177 | 1177 | 1177 | 1177 |
| dumptruck | 23350 | 11653 | 6578 | 4621 | 3531 | 2966 | 2675 | 2631 | 2601 | 2588 | 2578 |

FIG. 11

SYSTEM AND METHOD FOR PARAMETRIC SURFACE REPRESENTATION FROM POLYGONAL DESCRIPTIONS OF ARBITRARY OBJECTS

BACKGROUND OF THE INVENTION

1. Field of the Invention

The present invention relates to a completely automated method for converting a polygonal representation to a compact, high-quality surface representation using Bezier patches.

2. Description of the Related Art

There is a growing interest in the graphics, vision, and manufacturing communities to be able to digitize the shape and external appearance of objects for the purpose of transmission, display, and numerically controlled fabrication. This would have applications in product design, fast prototyping, reverse engineering, and digitizing shapes for the visual simulation, animation, and entertainment industries. Current advancement in laser range scanners now offers a promising methodology for fully-automated model acquisition of arbitrary objects. Several million points scanned on an arbitrary object can be converted easily into an irregular mesh of polygons. These polygons have to then be converted into a parametric surface representation, which is a more compact and manipulable form. This last step is referred to as the problem of surface reconstruction, and has been noted by CAD/CAGD as one of the top ten problems to be solved. Prior art on surface reconstruction method have generally been constrained by the enforced assumption that objects be well-behaved in the sense that they have no creases or sharp edges. Also, prior art surface representation construction methods are generally only semi-automated, i.e., require user intervention. Therefore, an improved system and method is desired for converting a polygonal representation to a compact, high quality surface representation using Bezier patches.

SUMMARY OF THE INVENTION

The present invention addresses the problem of describing an arbitrary object (up to user-defined limits) given a set of triangles with vertex normals describing the object. A novel method of successively merging triangles into larger and larger patches to compute a set of "as-few-as-possible" Bezier patches is presented. This method is not only applicable to arbitrary objects, but also aims at producing as few patches as possible depending on the geometry of the input object. Also presented are methods to enforce $C^0$- and $C^1$-continuity between a pair of patches $B_L(s,t)$ and $B_R(s,t)$, placed arbitrarily. The methods perturb the appropriate control points to achieve geometric continuities. For $C^0$-continuity the area of the hole between the patches is minimized by formulating the area as a series of linear programs, where the continuity has to be enforced across the adjacent boundary curves $B_L(1,t)$ and $B_R(0,t)$. Similarly, to enforce $C^1$-continuity the hole-area in tangential space is minimized.

Broadly speaking, the present invention contemplates a method for modifying a representation of an appearance of an object. The method includes the step of forming a dual graph for a set of patches of degree-d, which describe the appearance of the object. The method also includes the step of removing from the dual graph a set of edges representing (i) sharp edges of the object, (ii) junctions between patches which do not share a common side, (iii) junctions between patches with areas that differ by a predetermined amount. The method further includes the steps of processing remaining edges of the dual graph to determine a maximum cardinality matching which specifies a set of disjoint pairs, and combining the disjoint pairs to form a set of patches of degree d+1.

The present invention further contemplates a method for improving the digitized appearance of an object, which is described by a plurality of Bezier patches. The method includes the step of calculating a hole area between a pair of adjacent Bezier patches, which each possess associated patch-edge control points. The method also includes the steps of determining perturbation limits for the patch-edge control points, and reducing the hole area by perturbing the patch-edge control points within the perturbation limits. Reducing the hole area operates to improve the digitized appearance of the object.

BRIEF DESCRIPTION OF THE DRAWINGS

Objects and advantages of the invention will become apparent upon reading the following detailed description and upon reference to the accompanying drawings in which:

FIG. 2 is an illustration of rules used in determining pairs of combinable triangles and patches;

FIG. 3 illustrates a method for iteratively merging polygons to create a Bezier patch representation of an object from a set of triangles;

FIG. 6 illustrates a method for determining relative patch orientation;

FIG. 7 illustrates a subroutine for determining the area between two Bezier curves;

FIG. 8 illustrates a subroutine used to determine the limits of integration for alculating the area between two Bezier curves;

FIG. 9 illustrates a method for enforcing $C^0$ and $C^1$ continuities between adjacent patches in a Bezier patch representation of an object;

FIG. 10 illustrates a subroutine for minimizing the hole area and tangential hole area between adjacent Bezier patches;

FIG. 11 is a table demonstrating results of applying the merging method to exemplary object representations.

Figure 1:
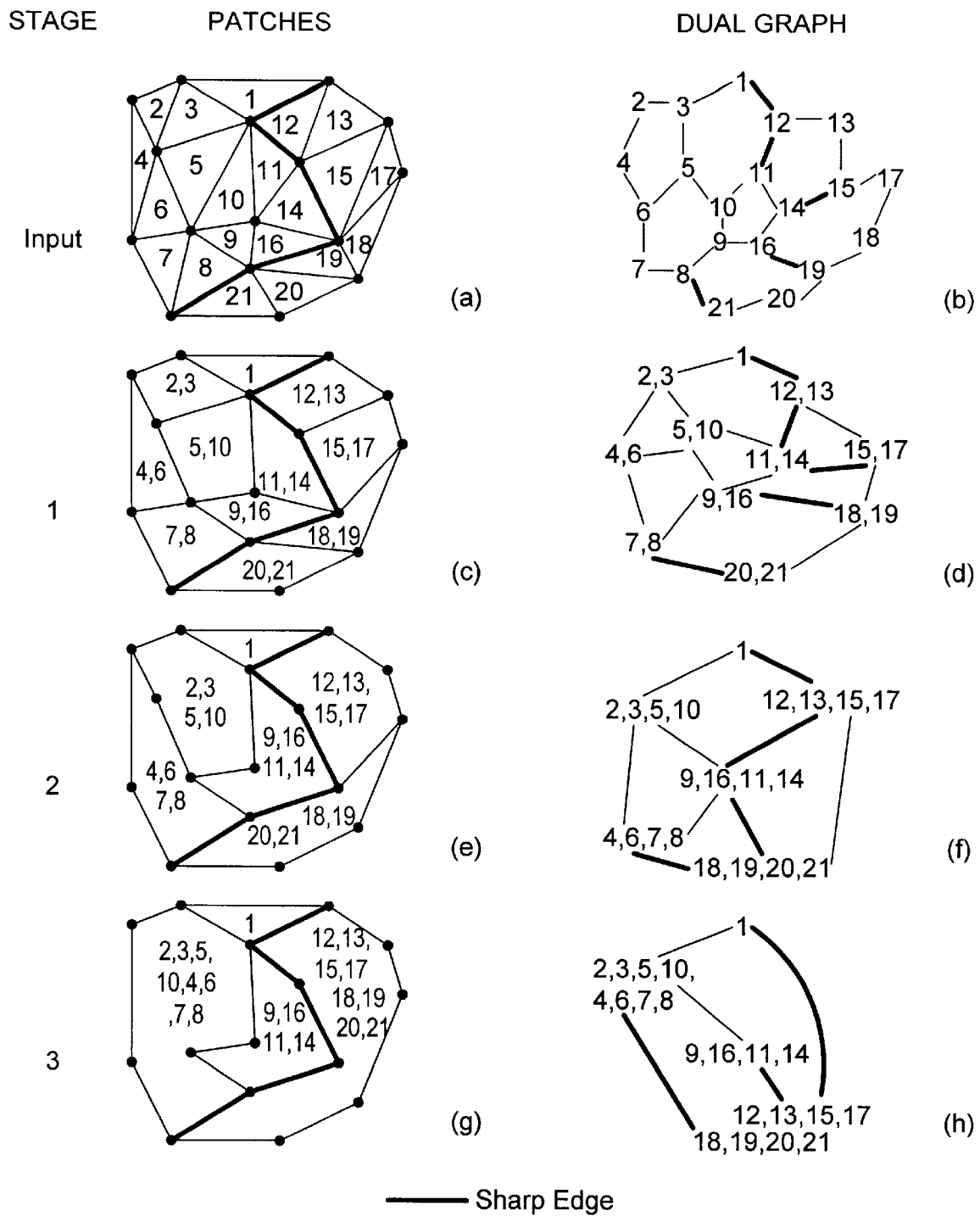
FIG. 1 is a table illustrating a time evolution of the object representation and its dual graph as the method is executed.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The present invention comprises a system and method for describing an arbitrary object. After receiving a tessellation of (i.e. a set of polygons describing) an arbitrary object the present invention solves the problem of computing a set of "as-few-as-possible" Bezier patches that approximates the given object within user-specified tolerance limits. Work on surface reconstruction done in the past (e.g., M. Eck and H. Hoppe, "Automatic reconstruction of B-spline surfaces of arbitrary topological type," in Proc. SIGGRAPH '96 Conference, pp. 313–324, Aug. 4–9 (1996), New Orleans, La., which is hereby incorporated by reference as though fully and completely set forth herein, and V. Krishnamurthy and M. Levoy, "Fitting smooth surfaces to dense polygon meshes," in Proc. SIGGRAPH '96 Conference, pp. 313–324, Aug. 4–9 (1996), New Orleans, La., which is also hereby incorporated by reference as though fully and completely set forth herein) is either semi-automated (i.e., requires user intervention) or assumes objects to have no creases or sharp edges.

The following assumptions are made here:

1. the tessellation polygons are triangles,
2. three coordinates and three surface-normals (vertex-normals) are supplied for each triangle, and
3. Bezier patches constructed are bicubic i.e., 4×4 control points. The first assumption can be relaxed by introducing a pre-processing stage to convert arbitrary polygons to a set of triangles. Although the method can be adapted for constructing Bezier patches of arbitrary degree, the present invention assumes bicubic patches for practical reasons.

Figure 12:
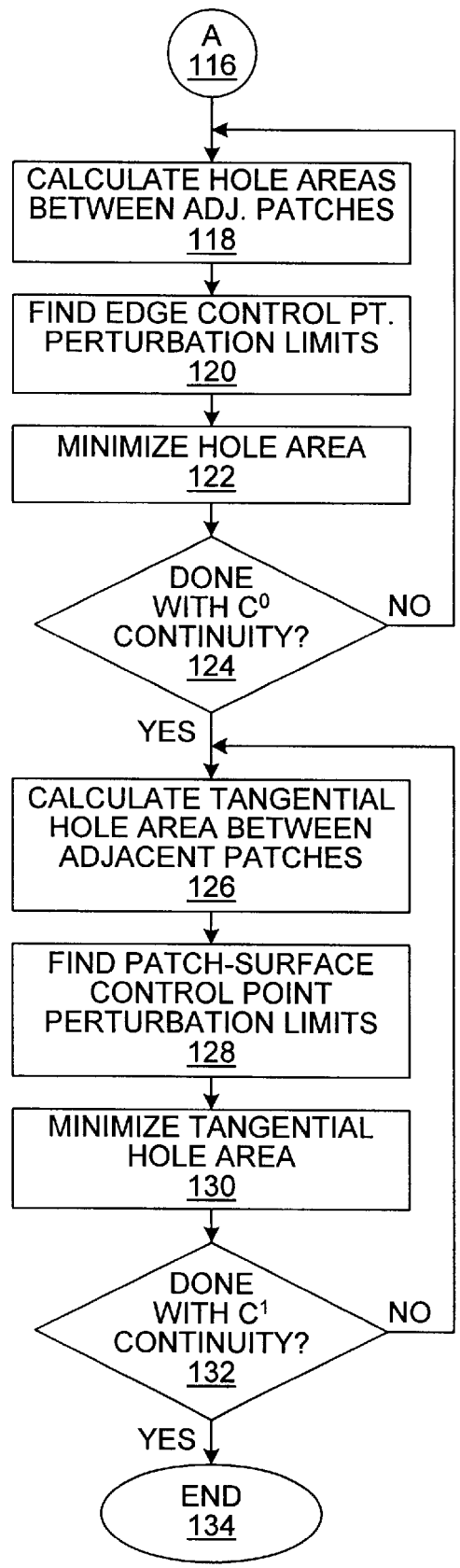
FIGS. 12A–B are a flowchart illustrating the high-level structure of the disclosed method.
Figure 12A:
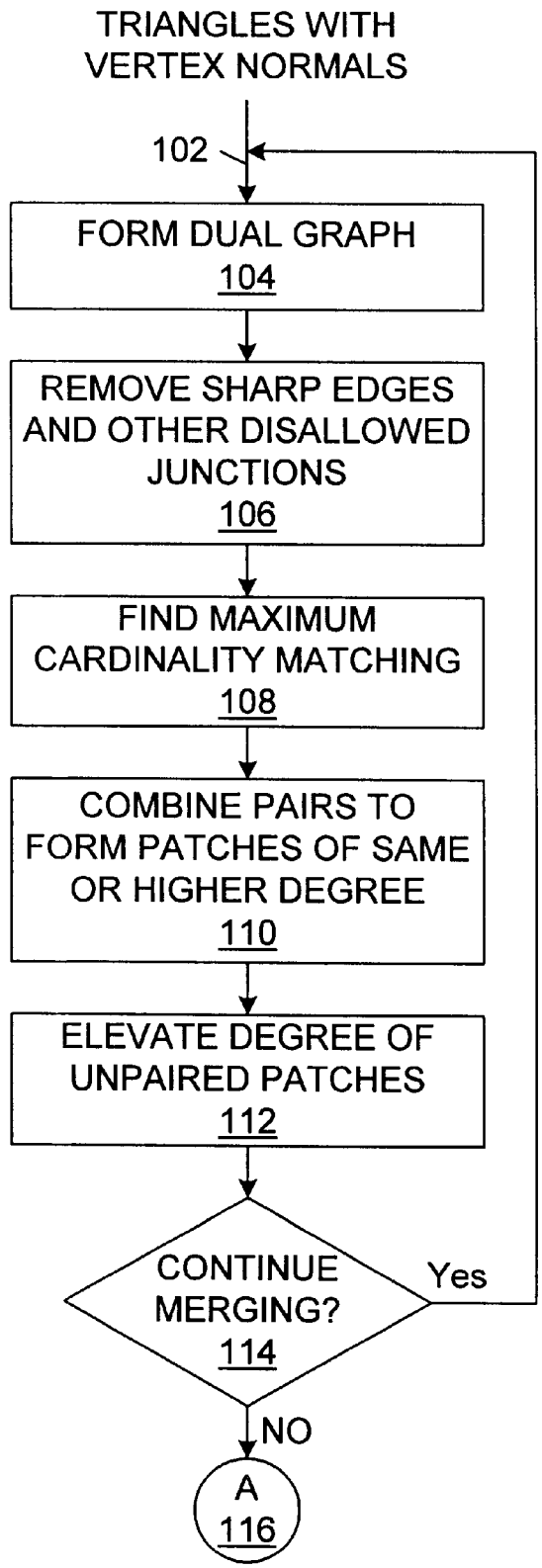

The present invention comprises a new method for the problem which includes two phases: (i) Successive merging of triangles into larger and larger patches, (ii) forcing $C^0$- and $C^1$-continuity among patches obtained from the first phase by perturbing appropriate control points. In the sections to follow the methods for the two phases are described, followed by some implementation details, and some computational results. As the methods are described, reference will be regularly made to FIG. 12 which provides a flowchart describing the high level structure of the methods. FIG. 12a illustrates the first phase and FIG. 12b illustrates the second phase.

The following explains the various terms used in the present disclosure. An undirected graph G=(V,E) is defined by a set V of nodes and a set E of edges, where each edge e∈E is an unordered pair of nodes. The cardinality |V| is denoted by n and |E| by m. A set, $T=\{t_1, t_2, \ldots, t_n\}$, of triangles in 3-D space is a good example of a graph, in which V is the set of all triangle vertices and E, the set of all triangle sides. The dual of such a graph is defined by letting each triangle $t_i$, $1 \leq i \leq n$, represent a node and letting each pair of triangles with a common side represent an edge. As an example, the dual of the graph in FIG. 1a (a 16-node, 35-edge graph) has 21 nodes (=21 triangles) and 28 edges, as shown in FIG. 1b. A subset M⊆E of edges of a graph G=(V,E) is called a matching of G if no two edges in M share a common node. The maximum-cardinality matching of a graph G is one that has the largest number of edges among all possible matchings of G. Obviously, the cardinality of such a matching is at most $\lfloor |V|/2 \rfloor$. As an example, for the dual graph in FIG. 1b the set of edges {(1,12), (2,4), (5,6), (7,8), (9,16), (11,14), (13,15), (17,18), (19,20)} is a matching, but not the maximum-cardinality matching. In fact, the set {(2,3), (4,6), (5,10), (7,8), (9,16), (11,14), (12,13), (15,17), (18,19), (20,21)} is a maximum-cardinality matching of the same graph, since it contains 10 (=$\lfloor 21/2 \rfloor$) edges.

A Bezier curve B(s) of degree d is given by a degree-d polynomial in s and is defined in terms of a set $g_i$, $0 \leq i \leq d$, of control points. Control points $g_0$ and $g_d$ lie on the curve B(s) whereas the others, in general, lie outside the curve. Similarly, a Bezier patch B(s,t) of degree d-by-d (also referred here as degree-d patch) is a degree d-by-d polynomial in s and t and is defined in terms of a set $g_{ij}$, $0 \leq ij \leq d$ of control points. Only control points $g_{00}$, $g_{0d}$, $g_{d0}$, and $g_{dd}$ necessarily lie on B(s,t). These four control points are referred to as the corners of a patch. The corners of a patch define a four-sided surface, $g_{00}$-$g_{0d}$-$g_{d0}$-$g_{00}$, which is referred to as the base of that patch. The control points $g_{01}$, $g_{02}$, $g_{d1}$, and $g_{d2}$ are examples of edge control points, i.e. control points that govern the shape of the patch edges. The remaining control points are herein referred to as surface control points.

Two patches are defined to be combinable if (at least) their bases share a common ide. Also, symbols $B(s)_a^b$ are used to represent a sub-curve of B(s) extending from arameters s=a to s=b; such a sub-curve can be obtained by reparameterizing the original curve into the new form B((s-a)/(b-a)).

Further discussion on graphs (including related methods) can be found in standard textbooks, e.g., N. Deo, *Graph Algorithms with Applications to Engineering and Computer Science* (1974) Englewood Cliffs, N.J., which is hereby incorporated by reference as though fully and completely set forth herein, M. M. Syslo, N. Deo, and J. S. Kowalik, *Discrete Optimization Algorithms: With Pascal Programs* (1983) Englewood Cliffs, N.J., which is hereby incorporated by reference as though fully and completely set forth herein, and F. Harary, *Graph Theory* (1988) Addison-Wesley, which is hereby incorporated by reference as though fully and completely set forth herein. Readers can refer to J. D. Foley, A. van Dam, S. K. Feiner, and J. F. Hughes, *Computer Graphics: Principles and Practice*, Chap. 11 (1990) Addison-Wesley, for details on Bezier curves/patches. The above chapter is hereby incorporated by reference as though fully and completely set forth herein.

SUCCESSIVE MERGING

The overall structure of this phase is illustrated in FIG. 12a. A set of polygons or patches is provided at input 102. In step 104, a dual graph is formed for the graph representing the set of input polygons or patches. In step 106, edges of the dual graph are removed according to criteria discussed further below. A maximum-cardinality matching is then performed on the dual graph in step 108. The resulting pairs indicate pairs of polygons or patches that are combined in step 110. Any unpaired polygons or patches are then promoted as though they had been combined with another polygon or patch. In step 114, a decision is made to continue iterating on the first phase or to progress to the second phase via node 116.

The central idea used in this phase is that of merging pairs of small degree-d patches into larger patches of degree d or d+1. To start with, a given set of n triangles is matched to obtain pairs of triangles that are "combinable". Each pair of matched triangles can then be combined to give a degree-1 patch. Then, the procedure is repeated on degree-1 patches (instead of triangles) to obtain even fewer degree-2 patches; and further repeated on degree-2 patches to obtain degree-3 patches. At any stage if there are unmatched patches, the degree of such isolated patches is elevated by one. For more information on degree elevation, please see A. Watt and M. Watt, *Advanced Animation and Rendering Techniques*, Chap. 3 (1993), Addison-Wesley, which is hereby incorporated by reference as though fully and completely set forth herein.

Once all the patches are bicubic, the described combining step is preferably repeated further, but this time, the pairs of bicubic patches are combined into larger patches of the same degree (i.e, three). One such extra step of combining decreases the number of patches appreciably without affecting the fit of the patches significantly, as shown by the computational results of FIG. 11.

FIG. 1 illustrates an example of successive merging on 21 triangles. In this example the procedure is repeated three times; the number of patches at the end of iteration 1 (FIG. 1c) is 11, at the end of iteration 2 (FIG. 1e) is 6, and at the end of iteration 3 (FIG. 1g) is 4. The corresponding dual graphs are shown in FIGS. 1d, 1f, and 1g respectively.

Selection of Which Triangles to Combine

The following section describes how to obtain the "best" set of matches among triangles (or patches) and how to combine a pair of patches to get a larger patch. For a given set of triangles the dual graph (see the previous subsection) contains an edge for every possible triangle-pair that can potentially be combined. The dual graph for a subsequent stage is obtained from one for the previous stage by short-cutting every edge that belongs to the matching of the previous stage. Each pair of matched nodes is collapsed to give a single node for the next dual graph. This is followed by renumbering the nodes using consecutive labels. Readers may note that a dual graph may contain more edges than the ones representing combinable pairs of patches. For example, the dual graph will contain an edge for a patch-pair that looks like the one in FIG. 2d, although such a pair is not combinable. The subgraph, $G_c$, of the dual graph, G, that precisely contains edges representing only combinable patch-pairs is obtained by retaining only those edges of G that pass the following tests:

For Triangles (Stage 1 only):
(i) Sharp Edge Test (FIG. 2a): Two triangles are not combined if the surface normals on the common corners of the triangles differ significantly.
(ii) Degeneracy Test (FIG. 2b): Two triangles are not combined if the resulting surface is a triangle (or even "nearly" triangle). It is checked by testing collinearity of corner points (e.g., Points 1, 2, and 3 in FIG. 2b are nearly collinear).

For Patches (Other stages):
(i) Common Corner Test (FIG. 2c and 2d): Two patches are not combined if their bases do not share a common side.
(ii) Sharp Edge Test (FIG. 2e): Two patches are not combined if the surface normals on the common corners of the patches differ significantly.
(iii) Patch Area Test (FIG. 2f): Two patches are not combined if their surface areas differ significantly.
(iv) Boundary Skew Test (FIG. 2g): Two patches are not combined if a boundary of the resulting surface has high curvature. (Readers may note that the pair of patches in FIG. 2g passes the Sharp Edge Test.) It is checked by testing if the angle between the boundary curves of the two patches (such as (1,2) and (2,3)) differs significantly from 180°.

Once the graph $G_c$ has been obtained, the maximum-cardinality matching of that graph gives the "best" set of matches; since larger the cardinality, fewer will be the number of patches in the next stage. Such matchings can be computed in $O(n^3)$ time (e.g., J. Edmonds, "Paths, trees, and flowers," Canadian J. Math. 17 (1965) 449–467, and H. Gabow, "An efficient implementation of Edmonds algorithm for maximum matching on graphs," J. ACM 23 (1975) 221–234), where n is the number of nodes in the graph. One particularly good method that can be implemented easily is due to U. Pape and D. Conradt, "Maximales matching in graphen," in H. Spath (ed.) *Ausgewahlte Operations Research Software in FORTRAN* (1980) 103–114. Oldenburg, Munich. The above papers are hereby incorporated by reference as though fully and completely set forth herein.

Method for Combining Triangles and Patches

Control points for a large patch, say of degree dxd, that represents a combination of a given pair of adjacent patches is obtained by sampling the two given patches at $(d+1)^2$ different points, followed by parameterizing the sampled points with respect to the larger patch, and then solving a system of $(d+1)^2$ linear equations for the $(d+1)^2$ new control points. If the application at hand requires greater accuracy, the patches can be sampled at even more than $(d+1)^2$ points to form an overspecified system of equations, which can then be solved using least-square approximations instead (of a system of linear equations). Next, a specific example is provided.

Let $B_L(s,t)$ and $B_R(s,t)$ denote a pair of combinable degree-d Bezier patches (left and right patches) that are to be combined into a single large patch $B(s,t)$. Let $g_{ij}^L$ and $g_{ij}^R$, $0 \leq i,j \leq d$, denote the control points for the left and right patches, respectively and $g_{ij}$, $0 \leq i,j \leq d+1$ for the larger patch. It is assumed that control points $g_{d0}^L$ and $g_{dd}^L$ are the same as $g_{00}^R$ and $g_{0d}^R$, respectively (or else, a pair of combinable patches is reoriented to satisfy this condition). Then $g_{ij}$ can be obtained in terms of $g_{ij}^L$ and $g_{ij}^R$, as follows. Consider for example the case d=2. In this case, solving for $g_{ij}$, $0 \leq ij \leq 3$ (say, using MAPLE) is performed by using the following 16 equations:

$B(0,0)=B_L(0,0); B(0,1/3)=B_L(0,1/3); B(0,2/3)=B_L(0,2/3); B(0,1)=B_L(0,1);$
$B(1/3,0)=B_L(2/3,0); B(1/3,1/3)=B_L(2/3,1/3); B(1/3,2/3)=B_L(2/3,2/3); B(1/3,1)=B_L(2/3,1);$
$B(2/3,0)=B_R(1/3,0); B(2/3,1/3)=B_R(1/3,1/3); B(2/3,2/3)=B_R(1/3,2/3); B(2/3,1)=B_R(1/3,1);$
$B(1,0)=B_R(1,0); B(1,1/3)=B_R(1,1/3); B(1,2/3)=B_R(1,2/3); B(1,1)=B_R(1,1);$ the result is:

$g_{00} := g_{00}^L$ $g_{01} := 1/3\, g_{00}^L + 2/3\, g_{01}^L$ $g_{02} := 2/3\, g_{01}^L + 1/3\, g_{02}^L$ $g_{03} := g_{02}^L$ $g_{10} := -1/2\, g_{00}^L + 1/6\, g_{01}^L + 2/3\, (g_{20}^L + g_{00}^R)/2 - 2/3\, g_{10}^R + 4/3\, g_{10}^L$ $g_{11} := 8/9\, g_{11}^L - 1/6\, g_{00}^L - 1/3\, g_{01}^L + 4/9\, g_{10}^L - 2/9\, g_{10}^R + 2/9\, (g_{20}^L + g_{00}^R)/2 + 4/9\, (g_{21}^L + g_{01}^R)/2 - 4/9\, g_{11}^R + 1/18\, g_{20}^R + 1/9\, g_{21}^R$ $g_{12} := -1/3\, g_{01}^L - 1/6\, g_{02}^L + 8/9\, g_{11}^L + 4/9\, g_{12}^L + 4/9\, (g_{21}^L + g_{01}^R)/2 + 2/9\, g_{12}^R - 4/9\, g_{11}^R + 1/9\, g_{21}^R + 1/18\, g_{22}^R$ $g_{13} := -1/2\, g_{02}^L + 4/3\, g_{12}^L + 1/6\, g_{22}^R + 2/3\, (g_{22}^L + g_{02}^R)/2 - 2/3\, g_{12}^R$ $g_{20} := 1/6\, g_{00}^L - 1/2\, g_{20}^R + 2/3\, (g_{20}^L + g_{00}^R)/2 + 4/3\, g_{10}^R - 2/3\, g_{10}^L$ $g_{21} := 1/18\, g_{00}^L + 1/9\, g_{01}^L - 2/9\, g_{10}^L - 4/9\, g_{11}^L + 2/9\, (g_{20}^L g_{00}^R)/2 + 4/9\, g_{21}^L + g_{01}^R)/2 + 8/9\, g_{11}^R + 4/9\, g_{10}^R - 1/6\, g_{20}^R - 1/3\, g_{21}^R$ $g_{22} := 1/9\, g_{01}^R + 1/18\, g_{02}^L - 4/9\, g_{11}^L - 2/9\, g_{12}^L + 4/9\, (g_{21}^L + g_{01}^R)/2 + 4/9\, g_{12}^R + 8/9\, g_{11}^R - 1/3\, g_{21}^R - 1/6\, g_{22}^R$ $g_{23} := 1/6\, g_{02}^L - 2/3\, g_{12}^L - 1/2\, g_{22}^R + 2/3\, (g_{22}^L + g_{02}^R)/2 + 4/3\, g_{22}^R$ $g_{30} := g_{20}^R$ $g_{31} := 1/3\, g_{20}^R + 2/3\, g_{21}^R$ $g_{32} := 2/3\ g^R{}_{21} + 1/3\ g^R{}_{22}$ $g_{33} := g^R{}_{22}$

In the solution derived it may be noted that there are a few terms on the right-hand side given as mean of two coordinates e.g., $(g^L{}_{21} + g^R{}_{01})/2$ in the expression for $g_{11}$. Ideally such coordinates must be identical i.e., $g^L{}_{21}$ identical to $g^R{}_{01}$. On similar lines solutions can be derived for combining patches of arbitrary (but a fixed) degree. A summary outline of the first phase of the method is given in FIG. 3.

PATCH CONTINUITY

The overall structure of this phase is shown in FIG. 12b. The set of merged patches from the first phase are received via node 116. In step 118, the areas of holes between adjacent patches is calculated. These areas are used to set limits to allowable perturbations of patch-edge control points in step 120. The patch-edge control points are then perturbed to minimize the hole areas in step 122. A decision is made in step 124 whether to continue iterating to further minimize hole areas, or to continue with the next portion of the second phase. In step 126, the tangential discontinuities are calculated, and in step 128 the area of these discontinuities is used to set limits on allowable perturbations of patch-surface control points. In step 130, the patch-surface control points are perturbed to minimize the area of the discontinuities. In step 132, a decision is made whether to continue iterating to further minimize tangential discontinuities, or to conclude the second phase by proceeding to node 134. The details of the second phase are discussed below.

The bicubic patches that were obtained at the end of successive merging must be refined further due to the following reasons:
1. Two adjacent patches may have holes between them due to lack of $C^0$-continuity i.e., points on the common boundary do not match.
2. Two adjacent patches may not look smooth at the common boundary due to lack of $C^1$-continuity i.e., the tangents at the common boundary do not match.

Solutions to both these problems are formulated in terms of a series of linear programs—one for each pair of patches with a particular kind of discontinuity. Every edge in the dual graph obtained at the end of the first phase represents a pair of patches which are required to satisfy $C^0$ continuity. For $C^1$-continuity only a subset of these pairs are required to be considered; $C^1$-continuity need not be enforced for those patch-pairs that share between them a sharp edge. For example, in FIG. 1g there are four bicubic patches obtained at the end of the first phase; among them 5 pairs of patches are required to satisfy $C^0$-continuity corresponding to the five edges of the dual graph (FIG. 1h). However, only 2 pairs of patches are required to satisfy $C^1$-continuity—corresponding to the two thin edges in the dual graph.

Figure 4:
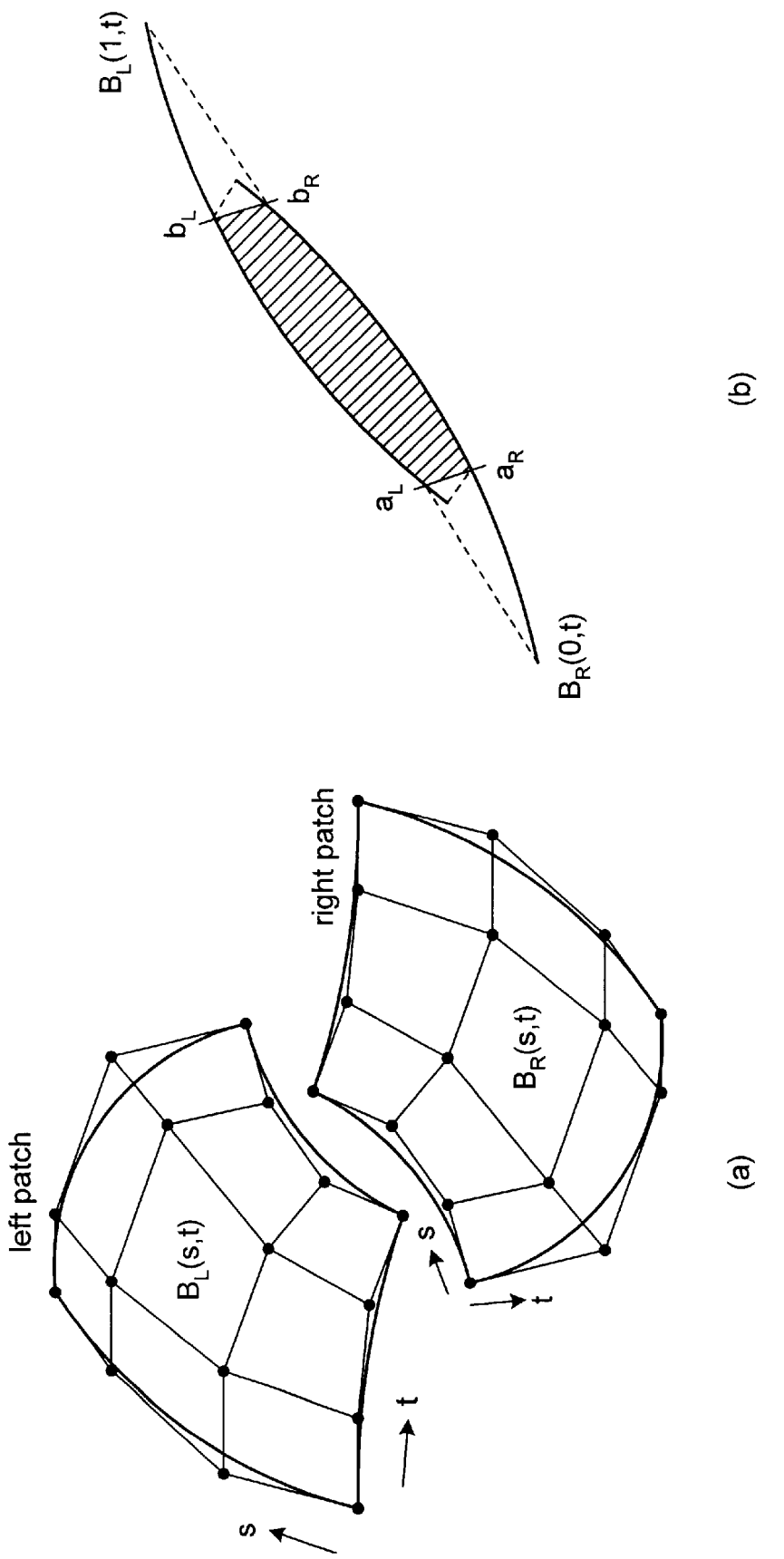
FIG. 4 is an illustration of a hole between adjacent Bezier patches which is used to demonstrate the method of determining the hole area.

For a given pair of patches the boundary curves of the patches across which the discontinuity occurs are first determined, and then the relevant extent of parameters on these boundary curves is estimated. This is followed by formulation of linear programs. $C^0$-continuity for a given pair of bicubic patches is achieved by suitably perturbing edge control points $g^L{}_{31}$, $g^L{}_{32}$ of the left patch and edge control points $g^R{}_{01}$, $g^R{}_{02}$ of the right patch (assuming s-t axes are as shown in FIG. 4a), so that the two curves $B_L(1,t)$ and $B_R(0,t)$ get as close to each other as possible. Similarly, $C^1$-continuity is achieved by suitably perturbing surface control points $g^L{}_{21}$, $g^L{}_{22}$ of the left patch and $g^R{}_{11}$, $g^R{}_{12}$ of the right patch. In practice, first all optimizations for $C^0$-continuity are performed and then a similar procedure is repeated for $C^1$-continuity. In the following subsections each of the steps is described in greater detail and the necessary methods are developed.

Figure 5:
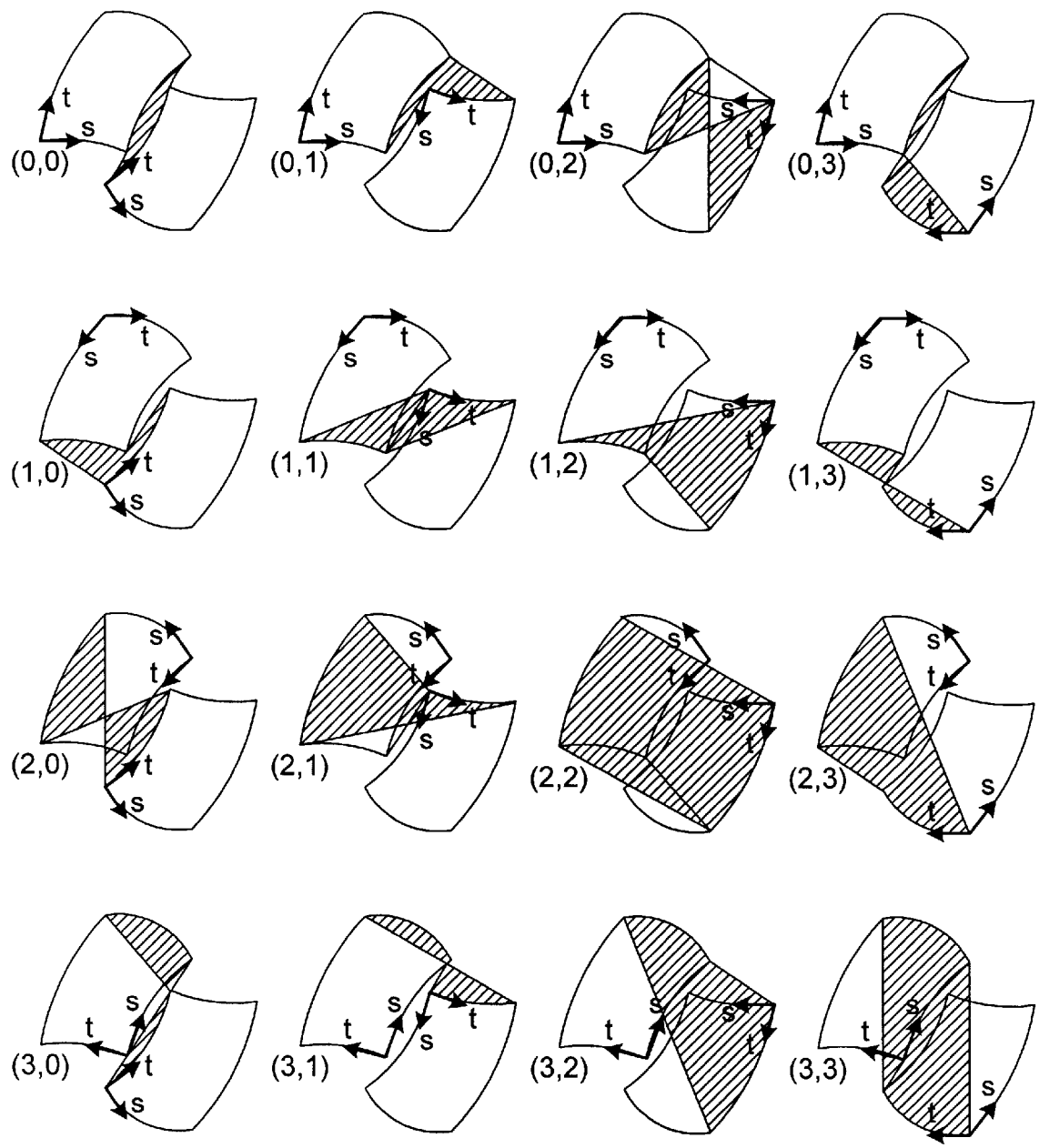
FIG. 5 is an illustration demonstrating the feasibility of an method for determining relative patch orientation.

It may be noted that there are only 16 possible configurations (FIG. 5) of the s-t axes for a given pair of patches. (This assumes that both patches have fixed orientations for their normals, or else there would be 64=8×8 configurations by swapping the s- and t-axes themselves.) Conversion of a pair of patches into a fixed "canonical form" (i.e, discontinuity is across curves $B_L(1,t)$ and $B_R(0,t)$) can be done by rotating the two patches counterclockwise a fixed number of times, given by $\text{rot}_L$ and $\text{rot}_R$. These two numbers are computed according to the method shown in FIG. 6.

In Line 6 of the procedure in FIG. 6, the area between two Bezier curves is computed. This can be achieved by first approximating each of the Bezier curves with a set of line segments and then summing up area of the trapezoids obtained. The method for this is provided in FIG. 7.

Once a pair of patches $B_L(s,t)$ and $B_R(s,t)$ is converted into canonical form, the discontinuity is between curves $B_L(1,t)$ and $B_R(0,t)$. However, since only a small part of the two curves may actually be adjoining (see FIG. 4a), it is necessary to compute parameters $a_L$, $b_L$, $a_R$, and $b_R$ such that only the subcurves $B_L(1,t)|_{a_L}^{b_L}$ and $B_R(0,t)|_{a_R}^{b_R}$ are relevant.

One way to estimate these four parameters is to find for each endpoint of the curve $B_R(0,t)$ (i.e., $B_R(0,0)$ and $B_R(0,1)$) the closest point on curve $B_L(1,t)$; and similarly, for each endpoint of $B_L(1,t)$ the closest point on curve $B_R(0,t)$. Parameters corresponding to the two closest points on $B_L(1,t)$ give $a_L$ and $b_L$; and similarly, the closest points on $B_R(0,t)$ for the two endpoints of $B_L(1,t)$ give $a_R$ and $b_R$ (see FIG. 4b).

Next, a method is described to find for a given Bezier curve B(t) and a given point p, the point on B(t) closest to p. The closest point is computed in two phases (see FIG. 8). A coarse search is first performed by localizing the closest point to be within a particular segment of the curve. This is followed by an intense search within that segment.

Given a pair of patches $B_L(s,t)$ and $B_R(s,t)$ in canonical form and parameters aL, $b_L$, $a_R$, and $b_R$, the present invention minimizes the area of the hole between the subcurves $B_L(1,t)|b_L$ and $B_R(0,t)|b_R$. In subsequent discussion on $C^0$-continuity, the s-parameter is dropped since it remains a constant. The hole area can be computed as $$\int_o^1 \left|(B_L(t)|_{a_L}^{b_L}) - (B_R(t)|_{a_R}^{b_R})\right| dt$$

where, $$B(t)|_a^b = B\left(\frac{t-a}{b-a}\right) = \left[\left(\frac{t-a}{b-a}\right)^3 \left(\frac{t-a}{b-a}\right)^2 \left(\frac{t-a}{b-a}\right) 1\right] M\ [g_0\ g_1\ g_2\ g_3]^T$$

Here, $g_0$, $g_1$, $g_2$, $g_3$ are the four control points of the Bezier curve B(t) and $$M = \begin{bmatrix} -1 & 3 & -3 & 1 \\ 3 & -6 & 3 & 0 \\ -3 & 3 & 0 & 0 \\ 1 & 0 & 0 & 0 \end{bmatrix}.$$

This can further be simplified to the form $[t^3\ t^2\ t\ 1]$ D M $[g_0\ g_1\ g_2\ g_3]^T$, where $$D = \frac{1}{(b-a)^3} \begin{bmatrix} 1 & 0 & 0 & 0 \\ -3a & (b-a) & 0 & 0 \\ 3a^2 & -2a(b-a) & (b-a)^2 & 0 \\ -a^3 & a^2(b-a) & -a(b-a)^2 & (b-a)^3 \end{bmatrix}$$

Note that the area of the hole is being estimated in "rectilinear" metric, in which distance between two points $(x_1,y_1,z_1)$ and $(x_2,y_2,z_2)$ is given by $(|x_1-y_2|+|y_1-y_2|+|z_1-z_2|)$ as opposed to the usual Euclidean distance. This metric is chosen to keep the objective for the minimization problem simple (i.e., a linear function and NOT quadratic or higher order). Also, it may be noted that minimization must be done independently for each of the three dimensions, since the integral implies three separate components, namely:

$$\text{minimize} = \int_0^1 \left|(B_L^X(t)|_{a_L}^{b_L}) - (B_R^X(t)|_{a_R}^{b_R})\right| dt$$

$$\text{minimize} = \int_0^1 \left|(B_L^Y(t)|_{a_L}^{b_L}) - (B_R^Y(t)|_{a_R}^{b_R})\right| dt$$

$$\text{minimize} = \int_0^1 \left|(B_L^Z(t)|_{a_L}^{b_L}) - (B_R^Z(t)|_{a_R}^{b_R})\right| dt$$

In the discussion to follow superscripts X, Y, and Z are dropped for simplicity.

Since the function within integral involves absolute values it is necessary to be careful about sign changes. In particular, it is necessary to find within the range $0 \leq t \leq 1$ all values of t at which the function becomes zero (i.e., roots of the function), and then decompose the integral into sub-ranges defined by these roots. Since the function $B_L(t)|_{a_L}^{b_L} - B_R(t)|_{a_R}^{b_R}$ is a cubic polynomial in t, it can have at most three roots. A routine must be written which returns all the real roots in the range 0 to 1, and sorted in an increasing order of value.

Let $r_i$'s denote the real roots of the function in the range $[0 \ldots 1]$ given in increasing order of value. Then, in the most general case, when there are three roots $r_1$, $r_2$, $r_3$ $$\int_0^1 \left|(B_L(t)|_{a_L}^{b_L}) - (B_R(t)|_{a_R}^{b_R})\right| dt = \left(\int_0^{r_1} T dt - \int_{r_1}^{r_2} T dt + \int_{r_2}^{r_3} T dt - \int_{r_3}^1 T dt\right)(D_L M G_L - D_R M G_R)$$

$$= T'(D_L M G_L - D_R M G_R)$$

where $G_L = [g_0^L \ g_1^L \ g_2^L \ g_3^L]^T$, $G_R = g_0^R \ g_1^R \ g_2^R \ g_3^R$, and the 1×4 matrix T' is provided in the table below for different numbers of roots.

| # Roots | 1 × 4 Matrix T' |
|---|---|
| 0 | $\left[\frac{1}{4} \ \frac{1}{3} \ \frac{1}{2} \ 1\right]$ |
| 1 | $\left[\frac{1}{2}\left(r_1^4 - \frac{1}{2}\right) \ \frac{2}{3}\left(r_1^3 - \frac{1}{2}\right) \ \left(r_1^2 - \frac{1}{2}\right) \ 2\left(r_1 - \frac{1}{2}\right)\right]$ |
| 2 | $\left[\frac{1}{2}\left(r_1^4 - r_2^4 + \frac{1}{2}\right) \ \frac{2}{3}\left(r_1^3 - r_2^3 + \frac{1}{2}\right) \ \left(r_1^2 - r_2^2 + \frac{1}{2}\right) \ 2\left(r_1 - r_2 + \frac{1}{2}\right)\right]$ |
| 3 | $\left[\frac{1}{2}\left(r_1^4 - r_2^4 + r_3^4 - \frac{1}{2}\right) \ \frac{2}{3}\left(r_1^3 - r_2^3 + r_3^3 - \frac{1}{2}\right) \ \left(r_1^2 - r_2^2 + r_3^2 - \frac{1}{2}\right) \ 2\left(r_1 - r_2 + r_3 - \frac{1}{2}\right)\right]$ |

Now, denote control points $g_1^L$, $g_2^L$, $g^{1R}$, and $g_2^R$ by symbols W, X, Y, and Z, since these four control points will be perturbed for $C^0$-continuity. (Recall that these four control points correspond to $g^L_{31}$, $g^L_{32}$, $g^R_{01}$, and $g^R_{02}$, respectively in patches.) Then, $$\int_0^1 \left|(B_L(t)|_{a_L}^{b_L}) - (B_R(t)|_{a_R}^{b_R})\right| dt = (T'D_L M [ g_0^L \ W \ X \ g_3^L ] - T'D_R M [ g_0^R \ Y \ Z \ g_3^R ])$$

$$= h_0 W + h_1 X + h_2 Y + h_3 Z + h_4$$

First an estimate is formed for the largest allowable perturbation, $\epsilon$, of a control point during the minimization. This is computed in terms of the average width of the hole which could be approximated by $$\frac{\left|(B_L(t)|_{a_L}^{b_L}) - (B_R(t)|_{a_R}^{b_R})\right|_{t=0} + |\cdots|_{t=1/3} + |\cdots|_{t=2/3} + |\cdots|_{t=1}}{4} =$$

-continued $$\left( \begin{array}{l} |[0\ 0\ 0\ 1](D_L M G_L - D_L M G_L)| + \left|\left[\frac{1}{27}\ \frac{1}{9}\ \frac{1}{3}\ 1\right](D_L M G_L - D_L M G_L)\right| + \\ \left|\left[\frac{8}{27}\ \frac{4}{9}\ \frac{2}{3}\ 1\right](D_L M G_L - D_L M G_L)\right| + |[1\ 1\ 1\ 1](D_L M G_L - D_L M G_L)| \end{array} \right) \Big/ 4$$

The value of $\epsilon$ may be chosen to be 5% of this width. Minimization is performed in small steps depending on the value of $\epsilon$, since the coefficients, $h_i$, $0 \le i \le 4$ of the objective are themselves dependent on the current values of W, X, Y, Z. If a control point is perturbed by too large an amount the actual coefficients $h_i$'s may deviate too much from their computed values. The minimization method is given in FIG. 9.

Next, a minimization of the hole area between the relevant boundaries of the two adjoining tangent subcurves (instead of the spatial subcurves) is performed. Whereas, for $C^0$-continuity the function $\int_0^1 |(B_L(t)|_{a_L}^{b_L}) - (B_R(t)|_{a_R}^{b_R})| dt$ was minimized by perturbing patch-edge control points $g^L_{31}$, $g^L_{32}$, $g^R_{01}$, and $g^R_{02}$; here, the area $$\int_0^1 |(\delta B_L/\delta s(t)|_{a_L}^{a_L}) - \delta B_R/\delta s(t)|_{a_R}^{b_R})| dt$$

is minimized by perturbing patch-surface control points $g^L_{21}$, $g^L 22$, $g^R_{11}$, and $g^R_{12}$. Note that the parameters $a_L$, $b_L$, $a_R$, $b_R$ remain the same for both the cases.

The left tangent curve $\delta B_L/\delta s(1,t)$ after reparameterizing in the range $t=a_L$ to $b_L$ turns out to be of the form $[t^3\ t^2\ t\ 1]\ E_L\ M\ G'_L$, where $$E_L = \frac{3}{(b_L - a_L)^3} \begin{bmatrix} -1 & 3 & -3 & 1 \\ 3b_L & -(3a_L + 6b_L) & (6a_L + 3b_L) & -3a_L \\ -3b_L^2 & (3b_L^2 + 6a_L b_L) & -(3a_L^2 + 6a_L b_L) & 3a_L^2 \\ -a_L^3 & 3a_L^2 b_L & -3a_L b_L^2 & b_L^3 \end{bmatrix}$$

-continued $$\text{and}\ G'_L = \begin{bmatrix} g^L_{30} - g^L_{20} \\ g^L_{31} - g^L_{21} \\ g^L_{32} - g^L_{22} \\ g^L_{33} - g^L_{23} \end{bmatrix}.$$

Similarly the right tangent curve $\delta B_R/\delta s(1,t)$ after reparameng in the range $t=a_R$ to $b_R$ turns out to be of the form $[t^3\ t^2\ t\ 1]\ E_R\ M\ G'_R$, where $$E_R = \frac{3}{(b_R - a_R)^3} \begin{bmatrix} 1 & -3 & 3 & -1 \\ -3b_R & (3a_R + 6b_R) & -(6a_R + 3b_R) & 3a_R \\ 3b_R^2 & -(3b_R^2 + 6a_R b_R) & (3a_R^2 + 6a_R b_R) & -3a_R^2 \\ -b_R^3 & 3a_R b_R^2 & -3a_R^2 b_R & a_R^3 \end{bmatrix}$$

$$\text{and}\ G'_R = \begin{bmatrix} g^R_{30} - g^R_{20} \\ g^R_{31} - g^R_{21} \\ g^R_{32} - g^R_{22} \\ g^R_{33} - g^R_{23} \end{bmatrix}.$$

On similar lines as $C^0$-continuity the roots of the function $T\ E_L\ M\ G'_L - T\ E_R\ M\ G'_R$ are first estimated, then the integration is decomposed into different subranges, and the expression is rewritten after integration as $T'(E_L\ M\ G'_L - E_R\ M\ G'_R)$. See the table above for the different values of the $1\times 4$ matrix T'. (NOTE: In this case the coefficients of an equivalent cubic polynomial are computed as $[c_0\ c_1\ c_2\ c_3]^T = E_L\ M\ G'_L E_R\ M\ G'_R$.)

In order to form a linear program for minimization, let W, X, Y, and Z denote $g^L_{21}$, $g^L\ 22$, $g^R_{11}$, and $g^R_{12}$. Then, the hole-area in the tangential space can be written as $$T'\left( E_L M \begin{bmatrix} g^L_{30} - g^L_{20} \\ g^L_{31} - W \\ g^L_{32} - X \\ g^L_{33} - g^L_{23} \end{bmatrix} - E_R M \begin{bmatrix} g^R_{00} - g^R_{10} \\ g^R_{01} - Y \\ g^R_{02} - Z \\ g^R_{03} - g^R_{13} \end{bmatrix} \right)$$

and expressed in the form $h_0 W + h_1 X + h_2 Y + h_3 Z + h_4$. The value of $\epsilon$ may then be computed as, say 5% of the mean hole-width, which in this case is given by $$\frac{\left|\left(\frac{\delta B_L}{\delta s}(1,t)|_{a_L}^{b_L}\right) - \left(\frac{\delta B_R}{\delta s}(0,t)|_{a_R}^{b_R}\right)\right|_{t=0} + |\cdots|_{t=1/3} + |\cdots|_{t=2/3} + |\cdots|_{t=1}}{4} =$$

$$\left( \begin{array}{l} |[0\ 0\ 0\ 1](E_L M G'_L - E_L M G'_L)| + \left|\left[\frac{1}{27}\ \frac{1}{9}\ \frac{1}{3}\ 1\right](E_L M G'_L - E_L M G'_L)\right| + \\ \left|\left[\frac{8}{27}\ \frac{4}{9}\ \frac{2}{3}\ 1\right](E_L M G'_L - E_L M G'_L)\right| + |[1\ 1\ 1\ 1](E_L M G'_L - E_L M G'_L)| \end{array} \right) \Big/ 4$$

The second phase of this method is summarized in FIG. 10.

IMPLEMENTATIONAL DETAILS

In this section important routines are described from the implementation point-of-view—first, for Successive Merging (phase I) and then, for Patch Continuity (phase II).
Phase I:
readDatabase(IN: char fname[ ])
A routine for reading input to the software.
createDataStructures( )
Process the input for efficient memory and CPU usage.

triangleDiscontiruity(IN: TRIANGLE T1, T2; OUT: float w)
patchDiscontinuity(IN: PATCH P1, P2; OUT: float w)
Assign a weight, denoting 'surface discontinuity', to the triangle-pair (patch-pair) T1–T2 (P1–P2). Lower weight implies that the pair will be favored during combining. If the two triangles (patches) have no common side, the weight is set to infinity.
createDualGraphTriangles(OUT: GRAPH G)
createDualGraphPatches(OUT: GRAPH G)
Returns a weighted graph in which each node is a triangle (patch), each edge represents a triangle-pair (patch-pair) for which the 'surface discontinuity' is finite, and each edge-weight is the 'surface discontinuity' value for that triangle-pair (patch-pair).
minMatching(IN: GRAPH G; OUT: MATCHING M)
Defn: The MIN-matching M of a graph G is a subgraph of G such that: (i) no two edges in M share a common node, (ii) # of edges in M is the largest, and (iii) sum of weights of edges in M is as low as possible. This procedure returns an approximate MIN-matching of G.
orientPatches(IN-OUT: PATCH P1, P2)
Alter the s-t origin for the two patches P1 and P2 to a canonical form. These two patches will be combined later.
deg1deg1todeg1(IN: PATCH P1, P2; OUT: PATCH P)
deg1deg1todeg2(IN: PATCH P1, P2; OUT: PATCH P)
deg2deg2todeg2(IN: PATCH P1, P2; OUT: PATCH P)
deg2deg2todeg3(IN: PATCH P1, P2; OUT: PATCH P)
deg3deg3todeg3(IN: PATCH P1, P2; OUT: PATCH P)
The above routines take a pair of patches (degree 1/2/3) and approximate them by a single patch. The two patches taken as input are assumed to be in canonical form.
elevatedeg1todeg2(IN-OUT: PATCH P)
elevatedeg1todeg3(IN-OUT: PATCH P)
elevatedeg2todeg3(IN-OUT: PATCH P)
For a given patch, returns a patch with a higher degree. These routines will be used in deg?deg?todeg?( ) routines.
Phase II:
readInput(IN: char fname[ ])
Reads the outputs generated of Phase I. This includes the set of patches and the last copy of the dual graph.
markC1continuityEdges(IN: Graph G; OUT: Boolean flag [num_egdes])
Among all edges of the dual graph (output of Phase I) mark those that are not separated by sharp edges.
cubicRoots(IN: float $c_0,c_1,c_2,c_3$; OUT: int nroots; float $r_1,r_2,r_3$)
Returns the roots of the cubic polynomial $c_3x^3+c_2x^2+c_1x+c_0$. The roots must be real nd must lie between 0 and 1. The number of such roots is returned in nroots, and the roots themselves sorted (increasing order) and returned in $r_i$'s.
closestPoints(IN: Bezier Curve B; Point p; OUT: float s)
Returns the parameter s of the curve B such that out of all points on B, the point B(s) is closest to the given point p.
simplex(IN: float $W_0,X_0,Y_0,Z_0,\epsilon,c_0,c_1,c_2,c_3$; OUT: float W',X',Y',Z')
Solves the 8-constraint, 4-variable, linear program using simplex and returns the optimal solution in W', X', Y', Z'.
rotatepatch(IN: int $num_{rot}$, Boolean flag; IN-OUT: Patch P)
Returns a (4×4) patch after rotating the given (4×4) patch P by $num_{rot}$ steps clockwise if input flag is set or counter-clockwise if input flag is not set.

COMPUTATIONAL RESULTS

Preliminary experiments with the disclosed method show that for an object with n triangles, this method produces close to n/16 bicubic Bezier patches. (The actual results are tabulated in FIG. 11.) Moreover, all sharp edges of the input object are preserved. Furthermore, the disclosed continuity methods produce a set of patches that are smooth and that on rendering provide high-quality images.

Numerous variations and modifications will become apparent to those skilled in the art once the above disclosure is fully appreciated. It is intended that the following claims be interpreted to embrace all such variations and modifications.

What is claimed is:

1. A method for forming a compact representation of a physical object, comprising:

scanning a plurality of points on the physical object;

converting the plurality of points into a set of triangles with vertices and vertex normals, wherein said set of triangles describes the appearance of the object;

forming a first dual graph of the set of triangles, wherein nodes of the dual graph correspond to triangles in the set of triangles, and wherein edges of the dual graph correspond to junctions between triangles in the set of triangles;

removing from the first dual graph a first set of edges representing (i) sharp edges of the object, (ii) junctions between triangles which may be combined to form a larger triangle;

processing remaining edges of the first dual graph to determine a first maximum cardinality matching specifying a first set of disjoint pairs; and combining said disjoint pairs of said first set of disjoint pairs to form a set of degree-1 patches.

2. The method of claim 1, wherein said sharp edges are defined to be junctions across which vertex normals differ by more than a predetermined amount.

3. The method of claim 1, wherein said maximum cardinality matching is determined algorithmically.

4. The method of claim 1, further comprising the steps of:

elevating unpaired triangles to degree-1 patches;

forming a second dual graph of the set of degree-1 patches;

removing from the second dual graph a second set of edges representing (i) sharp edges of the object, (ii) junctions between patches which do not share a common side, (iii) junctions between patches with areas that differ by a predetermined amount;

processing remaining edges of the second dual graph to determine a second maximum cardinality matching specifying a second set of disjoint pairs; and combining said disjoint pairs to form a set of degree-2 patches.

5. The method of claim 4, further comprising the steps of:

elevating unpaired degree-1 patches to degree-2 patches;

forming a third dual graph of the set of degree-2 patches;

removing from the third dual graph a third set of edges representing (i) sharp edges of the object, (ii) junctions between patches which do not share a common side, (iii) junctions between patches with areas that differ by a predetermined amount;

processing remaining edges of the third dual graph to determine a third maximum cardinality matching specifying a third set of disjoint pairs;

combining said disjoint pairs to form a set of degree-3 patches; and elevating unpaired degree-2 patches to degree-3 patches.

6. The method of claim 5, further comprising the steps of:

forming a dual graph of the set of degree-3 patches;

removing from the dual graph a set of edges representing (i) sharp edges of the object, (ii) junctions between patches which do not share a common side, (iii) junctions between patches with areas that differ by a predetermined amount;

processing remaining edges of the dual graph to determine a maximum cardinality matching specifying a set of disjoint pairs; and combining said disjoint pairs to form a second set of degree-3 patches.

7. The method of claim 5, further comprising the steps of:

calculating a hole area between a pair of adjacent patches, wherein said adjacent patches each possess associated patch-edge control points;

determining perturbation limits for patch-edge control points; and reducing the hole area by perturbing said patch-edge control points within said perturbation limits.

8. The method of claim 5, further comprising the steps of:

calculating a tangential hole area between a pair of adjacent patches, wherein said adjacent patches each possess associated patch-surface control points;

determining perturbation limits for patch-surface control points; and reducing the tangential hole area by perturbing said patch-surface control points within said perturbation limits.

9. A method for forming an improved compact representation of a physical object, wherein the method comprises:

scanning a plurality of points on the physical object;

converting the plurality of points into a set of triangles with vertices and vertex normals wherein said set of triangles describes the appearance of the object;

forming a first dual graph of the set of triangles, wherein nodes of the dual graph correspond to triangles in the set of triangles, and wherein edges of the dual graph correspond to junctions between triangles in the set of triangles;

removing from the first dual graph a first set of edges representing (i) sharp edges of the object, (ii) junctions between triangles which may be combined to form a larger triangle;

processing remaining edges of the first dual graph to determine a first maximum cardinality matching specifying a first set of disjoint pairs; and combining said disjoint pairs of said first set of disjoint pairs to form a set of Bezier patches;

calculating a hole area between a pair of adjacent Bezier patches, wherein said patches each possess associated patch-edge control points;

determining perturbation limits for patch-edge control points; and reducing the hole area by perturbing said patch-edge control points within said perturbation limits, wherein said reducing operates to improve the digitized appearance of the object.

10. The method of claim 9, further comprising the steps of:

calculating a tangential hole area between a pair of adjacent Bezier patches, wherein said patches each possess associated patch-surface control points;

determining perturbation limits for patch-surface control points; and reducing the tangential hole area by perturbing said patch-surface control points within said perturbation limits, wherein said tangential hole area reducing operates to improve the digitized appearance of the object.

11. The method of claim 9, wherein said control point perturbations are determined by using the simplex method on a function for the hole area with said perturbation limits.

12. A method for forming an improved compact representation of a physical object, wherein the method comprises:

scanning a plurality of points on the physical object;

converting the plurality of points into a set of triangles with vertices and vertex normals, wherein said set of triangles describes the appearance of the object;

forming a first dual graph of the set of triangles, wherein nodes of the dual graph correspond to triangles in the set of triangles, and wherein edges of the dual graph correspond to junctions between triangles in the set of triangles;

removing from the first dual graph a first set of edges representing (i) sharp edges of the object, (ii) junctions between triangles which may be combined to form a larger triangle;

processing remaining edges of the first dual graph to determine a first maximum cardinality matching specifying a first set of disjoint pairs; and combining said disjoint pairs of said first set of disjoint pairs to form a set of Bezier patches having a second dual graph with edges representing junctions between adjacent patches;

calculating a hole area for each edge in the second dual graph;

sorting edges into non-increasing hole-area order; and minimizing hole areas in sorted order for each edge having a hole area larger than a predetermined value, wherein said minimizing operates to improve the digitized appearance of the object.

13. The method of claim 12, further comprising the step of repeating hole area calculation, sorting, and minimization.

14. The method of claim 12, wherein the patches each have associated patch-edge control points, wherein the minimization step includes:

determining perturbation limits for patch-edge control points; and reducing the hole area by perturbing said patch-edge control points within said perturbation limits, wherein said control point perturbations are determined by using the simplex method with said perturbation limits on a function for the hole area.

15. The method of claim 14, further comprising:

removing from the second dual graph edges representing sharp junctions between adjacent patches;

calculating a tangential hole area for each remaining edge in the second dual graph;

sorting edges into non-increasing tangential-hole-area order; and minimizing tangential hole areas in sorted order for each edge having a tangential hole area larger than a predetermined value.

16. The method of claim 15, wherein the patches each have associated patch-surface control points, wherein the minimization step includes:

determining perturbation limits for patch-surface control points; and reducing the hole area by perturbing said patch-surface control points within said perturbation limits, wherein said control point perturbations are determined by using the simplex method with said perturbation limits on a function for the tangential hole area.

* * * * *